Patented May 8, 1934

1,958,376

UNITED STATES PATENT OFFICE 1,958,376

TREATMENT OF MATERIAL CONTAINING CELLULOSE

Neil C. Ward, Memphis, Tenn., assignor to Anderson-Tully Company, Memphis, Tenn., a corporation of Michigan No Drawing. Application July 1, 1933, Serial No. 678,729

5 Claims. (Cl. 92—7)

The invention relates to the treatment of material containing cellulose, such as wood.

One object of the invention is to provide an improved method of treating materials containing cellulose to produce cellulose in solution to render it available for manufacture of cellulose products.

With this object in view, the invention consists primarily in subjecting the material, such as wood, with the necessary moisture content, to pressure and heat until cellulose in solution is produced while substantially all other constituents of the material remain unaffected.

Other objects of the invention will appear from the detailed description.

The invention consists in the several novel features in the method hereinafter set forth and more particularly defined by claims at the conclusion hereof.

In the practice of the invention, material, such as wood which contains cellulose, is first preferably reduced to small pieces or defiberized, and is moistened, until its water content is approximately 60 to 85 per cent. This material is then subjected to pressure, either in a suitable press, or in a tank in which pressure is developed by a suitable gas until the material is subjected to a pressure of approximately 1500 pounds per square inch at a temperature of approximately 125° Fahrenheit. If finely divided or defiberized wood is used, the treatment under pressure and heat is continued for approximately three minutes.

At the end of this treatment, the product consists of cellulose in solution with substantially all other constituents of the wood remaining unaffected.

When substantially pure cellulose is desired for use in the manufacture of certain products, such as rayon, the material is filtered, either while in the press or afterwards, but before any chemical change occurs in the constituents of the material.

The moisture content of the wood may be varied within the limits necessary to produce the cellulose in solution with the treatment specified. The pressure to which the material is subjected may also be varied according to variations in the character of the material treated, so long as sufficient pressure is developed to produce the cellulose in solution. The temperature to which the material is subjected may also be varied so long as sufficient heat is present to produce the cellulose in solution with the pressure and moisture as aforesaid. In practice, it is important that the treatment with heat and pressure be discontinued before sugars are produced which would render cellulose unavailable for the uses desired.

If it is desired to accelerate the reaction, a small quantity of caustic soda or alkali, say a fraction of 1 per cent, may be added to the wood before it is subjected to pressure and heat.

When it is desired to produce fermentable sugars from the material containing cellulose, the treatment with pressure and heat is continued until the cellulose is converted into sugars. Then the sugars can be separated from the other materials by evaporation and crystallization or fermented in the solution without separation.

The invention may also be used for the manufacture of fibre-board. For this purpose, defiberized wood with water added until the moisture content is about 60 to 85 per cent, is subjected to pressure ranging approximately from 500 to 5000 pounds per square inch with the platens heated to about 170° centigrade. The pressure is continued from five to ten minutes. The excess moisture is expressed and evaporated from the board while in the press. The board is dried between the plates. In this practice, all of the constituents of the wood are utilized in the fibreboard and the cellulose in solution acts as a binder for the fibers in the material and renders the board suitable for commercial use.

The invention exemplifies a method of treating materials containing cellulose by which cellulose in solution is rendered available in cellulose products, at a low cost. Also a simple and efficient method for producing substantially pure cellulose for commercial use. Also an inexpensive method for producing fibre-board in which cellulose in solution is used to render the product homogeneous.

The invention is not to be understood to be restricted to the particular practice set forth, since this may be varied within the scope of the appended claims without departing from the spirit and scope of the invention.

Having thus described the invention, what I claim as new and desire to secure by Letters Patent, is:

1. That improvement which consists in producing cellulose by reducing material containing cellulose, and subjecting the reduced material with moisture to sufficient pressure and heat to produce cellulose in solution.

2. That improvement in treating material containing cellulose which consists in subjecting the material with moisture to heat and pressure to form cellulose in solution, and filtering the other constituents from the cellulose in solution.

3. That improvement in treating material containing cellulose which consists in subjecting the material with moisture to heat and pressure to form cellulose in solution, and filtering the other constituents from the cellulose in solution before any chemical change occurs.

4. That improvement in the treatment of materials containing cellulose, which consists in subjecting the material with moisture to pressure and heat until the cellulose is formed into a solution, and discontinuing the treatment before sugars are produced.

5. That improvement in the treatment of materials containing cellulose, which consists in subjecting the material to pressure and heat in the presence of moisture until the cellulose is in solution and continuing the treatment until the cellulose has been converted into sugars.

NEIL C. WARD.